| (12) | United States Patent | (10) Patent No.: | US 11,477,511 B2 |
|---|---|---|---|
| | Schafer et al. | (45) Date of Patent: | *Oct. 18, 2022 |

(54) DETERMINING REMOTE CONTROL STATE AND USER VIA ACCELEROMETER

(71) Applicant: ECHOSTAR TECHNOLOGIES L.L.C., Englewood, CO (US)

(72) Inventors: Adam Schafer, Aurora, CO (US); Jeremy Mickelsen, Denver, CO (US); Christopher Burns, Centennial, CO (US); Rashmi Hegde, Greenwood Village, CO (US)

(73) Assignee: DISH Technologies L.L.C., Englewood, CO (US)

( * ) Notice: Subject to any disclaimer, the term of this patent is extended or adjusted under 35 U.S.C. 154(b) by 1373 days.

This patent is subject to a terminal disclaimer.

(21) Appl. No.: 14/967,562

(22) Filed: Dec. 14, 2015

(65) Prior Publication Data

US 2016/0112668 A1 Apr. 21, 2016

Related U.S. Application Data

(63) Continuation of application No. 13/797,341, filed on Mar. 12, 2013, now Pat. No. 9,237,292.

(60) Provisional application No. 61/746,706, filed on Dec. 28, 2012.

(51) Int. Cl.
| H04N 5/44 | (2011.01) |
| H04N 21/422 | (2011.01) |
| H04N 21/442 | (2011.01) |
| H04N 21/45 | (2011.01) |
| H04N 21/4415 | (2011.01) |

(52) U.S. Cl.
CPC . *H04N 21/42204* (2013.01); *H04N 21/42222* (2013.01); *H04N 21/4415* (2013.01); *H04N 21/44222* (2013.01); *H04N 21/4532* (2013.01)

(58) Field of Classification Search
CPC .......... H04N 5/4403; H04N 21/42204; H04N 21/42222; H04N 21/4415; H04N 21/44222; H04N 21/4532
USPC ........................................................ 348/734
See application file for complete search history.

(56) References Cited

U.S. PATENT DOCUMENTS

| 2005/0243061 A1* | 11/2005 | Liberty | A61B 5/1171 |
| | | | 345/158 |
| 2010/0305899 A1* | 12/2010 | Czompo | G01C 25/005 |
| | | | 702/152 |
| 2011/0043475 A1* | 2/2011 | Rigazio | G06F 3/04883 |
| | | | 345/173 |
| 2011/0140868 A1* | 6/2011 | Hovang | G08B 25/008 |
| | | | 340/12.55 |
| 2012/0162073 A1* | 6/2012 | Kryze | G06F 1/266 |
| | | | 345/158 |
| 2012/0242560 A1* | 9/2012 | Nakada | G09G 3/3406 |
| | | | 345/8 |

(Continued)

*Primary Examiner* — Paulos M Natnael
(74) *Attorney, Agent, or Firm* — KW Law, LLP

(57) ABSTRACT

Methods, and system, and entertainment device are provided for identifying a user. A method includes detecting acceleration of a user manipulated component, comparing the detected acceleration with user acceleration that is associated with a user of the electronic device, identifying the user of the electronic device based on the comparison of the detected acceleration and the user acceleration, and operating the electronic device based on the identified user of the electronic device.

16 Claims, 4 Drawing Sheets

(56) References Cited

U.S. PATENT DOCUMENTS

2012/0324504 A1* 12/2012 Archer ............... H04N 21/4532
 725/30
2015/0094030 A1* 4/2015 Turgeman ............. H04W 12/06
 455/411

* cited by examiner

DETERMINING REMOTE CONTROL STATE AND USER VIA ACCELEROMETER

CROSS-REFERENCES TO RELATED APPLICATIONS

This Application is a continuation of U.S. patent application Ser. No. 13/797,341, filed Mar. 12, 2013, which claims priority to U.S. Provisional Application Ser. No. 61/746,706, filed Dec. 28, 2012.

TECHNICAL FIELD

The technical field generally relates to user identification of an electronic device, and more particularly relates to identification of a user of a television receiver based on acceleration of a remote control.

BACKGROUND

Identification of a user of an electronic device has long been either desirable or necessary, depending on the device and the particular environment in which the device is used. For example, access to a computer system or communication network is often strictly controlled or regulated, especially when the data accessible on such a system is of an extremely sensitive or confidential nature, such as corporate, financial, medical, or military records. Typically, the system being protected requires a prospective user to provide some proof of identity, such as a user name and/or password or other confidential data, before the user is granted to access the system.

Various circumstances, such as lost or forgotten passwords, stolen passwords, and other maladies, often lead to either an authorized user being denied access to a system, or an unauthorized user being granted access. Also, memorization and entry of user names and passwords, or other identifying information, is often considered tedious and overly time-consuming.

In response, alternative ways of securely identifying a user have been implemented or proposed. For example, the use of fingerprint scanners, retinal scanners, and similar devices which measure some user physical characteristic have been proposed to identify potential users to restrict access to a computer system to those authorized to do so. The use of such devices typically eliminates the need to enter a password or other identifying data, thus reducing the time required to access the secured system. Some systems, however, may not involve the extremely sensitive or confidential data that warrant such intensive security measures.

Accordingly, it is desirable to provide an improved method of identifying a user. Furthermore, other desirable features and characteristics of the embodiments disclosed herein will become apparent from the subsequent detailed description and the appended claims, taken in conjunction with the accompanying drawings and this background.

SUMMARY

A method is provided for identifying a user of an electronic device. In one embodiment, a method includes detecting acceleration of a user manipulated component, comparing the detected acceleration with user acceleration that is associated with a user of the electronic device, identifying the user of the electronic device based on the comparison of the detected acceleration and the user acceleration, and operating the electronic device based on the identified user of the electronic device.

An entertainment system is provided. In one embodiment, the entertainment system includes a remote control and a television receiver configured to receive video content from a media service provider. The remote control is configured to interact with the television receiver and includes control logic. The control logic is operable to detect acceleration of the remote control, compare the detected acceleration with user acceleration that is associated with a user of the electronic device, identify the user of the electronic device based on the comparison of the detected acceleration and the user acceleration, and operate the electronic device based on the identified user of the electronic device.

An entertainment device is provided. In one embodiment, the entertainment device includes an accelerometer and control logic. The control logic is operable to detect acceleration of the entertainment device using the accelerometer, compare the detected acceleration with user acceleration that is associated with a user of the entertainment device, identify the user of the entertainment device based on the comparison of the detected acceleration and the user acceleration, and operate the entertainment device based on the identified user of the entertainment device.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1A:
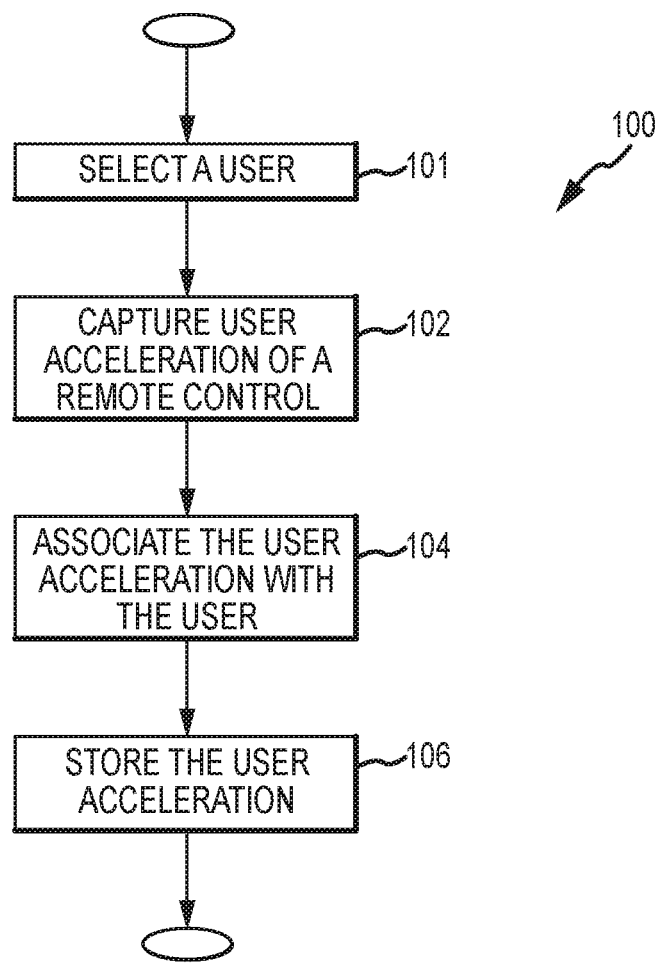
FIG. 1A is a flow diagram of a method in accordance with an embodiment.

FIG. 1A is a flow diagram describing a method 100 of identifying a user of an electronic device using a remote control. It should be appreciated that the remote control may be any user manipulated component, and may be separate from or integral with the electronic device. In some embodiments, the method 100 is performed for each of a plurality of users of the electronic device to associate particular acceleration of the remote control with a particular user. In some embodiments, the electronic device may be an audio/video entertainment device, such as a set-top box adapted to receive radio and/or television signals by way of satellite, cable, Internet Protocol, or terrestrial ("over-the-air") transmission. Other such audio/video devices may include televisions or video monitors, audio/video receivers, digital video recorders (DVRs), video cassette recorders (VCRs), digital video disc (DVD) players, and gaming systems. In some embodiments, electronic devices aside from audio/video devices, such as computers, personal digital assistants (PDAs), and communication devices may be utilized.

A user is selected in operation 101. In the example provided, the user is selected by entering information associated with the user into the electronic device using a graphical interface and the remote control. In some embodiments, users are selected based on an existing list of previously entered users.

User acceleration of the remote control is captured at operation 102. In the example provided, the user acceleration includes the magnitude and frequency of an electronic signal from an accelerometer in the remote control operated by the user, as will be described below. In some embodiments, the user acceleration is captured during events in which the user picks up the remote and during events in which the user is holding the remote. For example, the noise pattern from an accelerometer when the user is holding the remote may be used to identify the particular user. In some embodiments, data abstractions are stored based on the system details and capabilities. For example, such data abstractions may include average magnitude, harmonic content, or phase relations between various axes, among others.

The user acceleration is associated with the user in operation 104. For example, large acceleration may be associated with a first user rapidly picking up a remote control, while smaller acceleration may be associated with a second user gently picking up the remote control. In some embodiments, one user with a steady hand may be associated with light acceleration while holding the remote control while another user with a less steady hand may be associated with a larger acceleration while holding the remote control. In some embodiments, an angle of the remote control when held is determined and used with the detected acceleration to identify the user. The user acceleration associated with the user is stored in operation 106. For example, the user acceleration may be stored in the remote control or an electronic device such as a set-top-box, as will be described below.

Figure 1B:
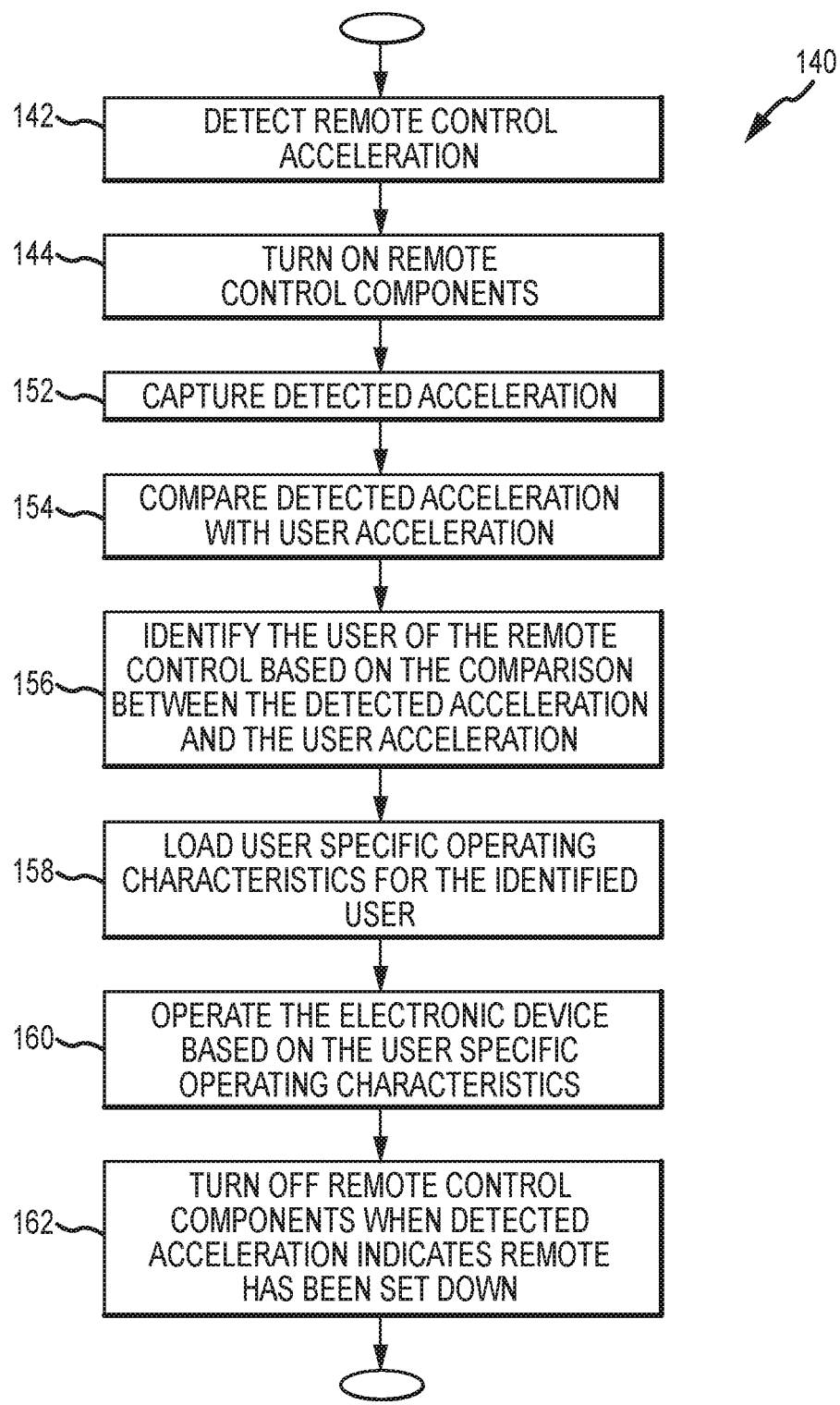
FIG. 1B is a flow diagram of a method in accordance with an embodiment.

FIG. 1B is a flow diagram describing a method 140 of identifying a user of an electronic device. For example, the operations of the method 140 may be performed by the electronic device or the remote control. Acceleration of a remote control is detected in operation 142. For example, a remote control being held by a user has a stronger noise pattern than a remote control that is not currently interacting with a user. In some embodiments, the user acceleration is captured when the user presses a button on the remote control. In the example provided, an interrupt in the hardware of the remote control is triggered when an accelerometer in the remote control outputs an electronic signal indicating acceleration above a threshold.

Components of the remote control are turned on in operation 144. For example, the remote control may exit a low power state to interact with the user. In the example provided, a light emitting diode (LED) indicator light is turned on to indicate that the remote control is ready. In some embodiments, other power consuming components are turned on, such as a backlight for buttons or an optical finger navigation (OFN) interface on the remote control.

The detected acceleration of the remote control is captured in operation 152. For example, the remote control may wake up from a low power state based on the hardware interrupt to begin capturing the detected acceleration by polling the output of the accelerometer. The detected acceleration may be captured immediately when the remote is picked up or may be captured when the user is holding the remote after the remote control has been picked up, as is illustrated below with reference to FIG. 3.

The detected acceleration is compared with the stored user acceleration in operation 154. For example, the magnitude and frequency of the accelerometer may be compared with previously stored accelerometer output that is associated with a particular user. In some embodiments, the detected acceleration is compared with the user acceleration for each of a plurality of users of the electronic device. The comparison methods incorporated may vary based on the degree of identification desired, the complexity of the detection circuitry, and the cost of the system. Examples of suitable matching methods include Viterbi algorithm methods, Fano algorithm methods, explicitly calculating the maximum covariance for each detected associated data pair, or by use of average amplitude.

In operation 156 the user of the remote control is identified based on the comparison performed in operation 154. In the example provided, the identification is based on a closest match between the magnitude and frequency of the detected acceleration and the magnitude and frequency of the user accelerations. In some embodiments, the identification is based on matching the user with the detected acceleration when the differences between magnitude and frequency of the stored user acceleration and the detected acceleration are within a predefined amount.

User specific operating characteristics are loaded in operation 158. The operating characteristics may include any information associating the user with the operation of the electronic device. In the example, the information is associated with a media set-top-box. For example, the information may include a list of favorite channels specified by the user, programming recommendations for the user, parental control information associated with the user, purchase information associated with the user, remote control codes to control certain devices, and peer group information associated with the user. In some embodiments, the information may indicate whether the identified user is a child to whom some or all of the functionality of the device may be prohibited, such as tuning a channel associated with mature content.

The electronic device is then operated based on the user specific operating characteristics loaded in operation 160. For example, the electronic device is operated using the user specific operating characteristics loaded in operation 158. When the detected acceleration indicates that the remote control has been set down, operation 162 turns off at least some of the components of the remote control. For example, the LED indicator light, the OFN, and the backlight may be turned off when the remote control is set down to conserve energy and extend battery life.

While FIG. 1A and FIG. 1B illustrate a specific order of execution of operations, other possible orders of execution may be undertaken in other implementations. The other possible orders of execution may include, for example, concurrent execution of one or more operations. In some embodiments, a non-volatile computer-readable storage medium may have encoded thereon instructions for a processor to implement the operations.

Figure 2:
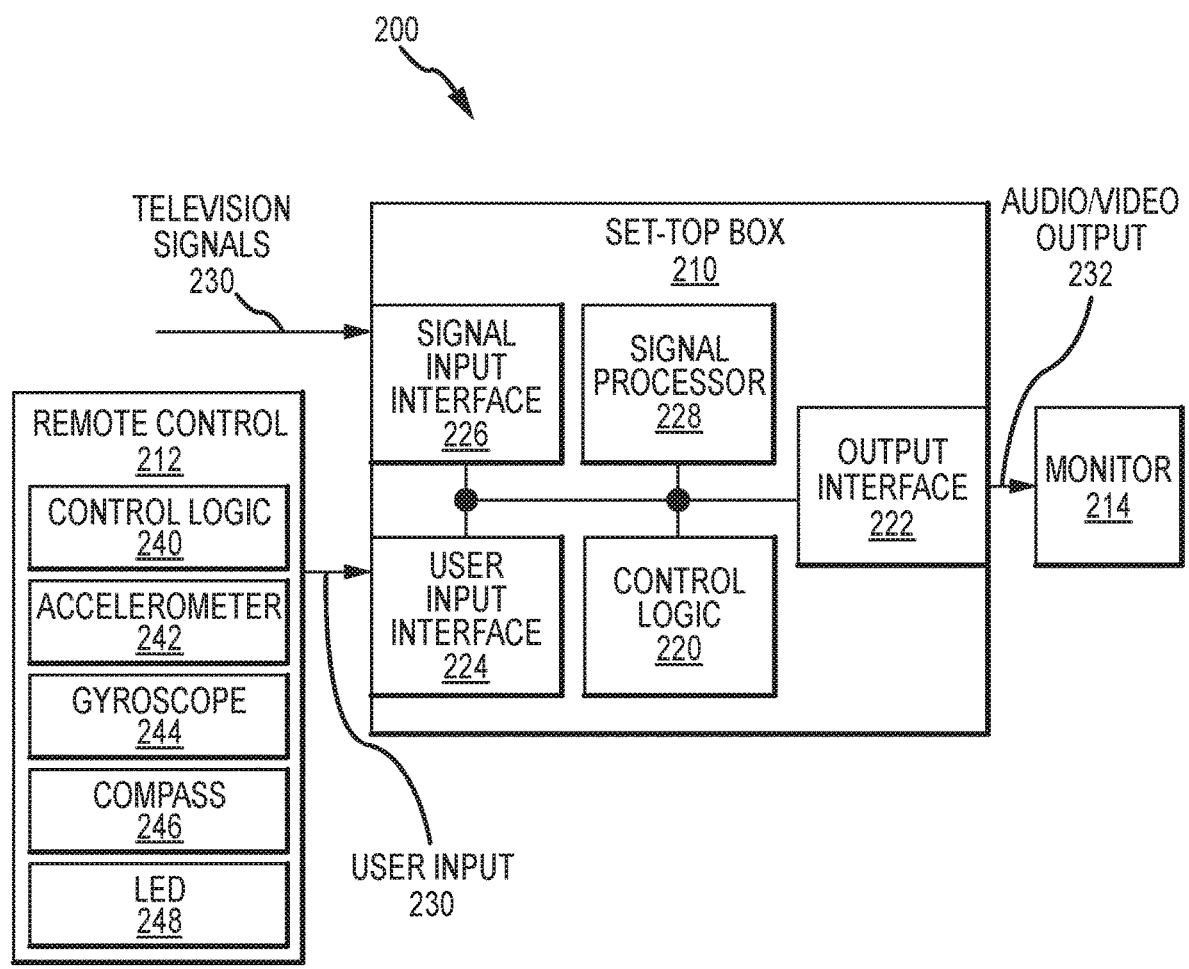
FIG. 2 is a simplified block diagram of an entertainment system in accordance with an embodiment.

FIG. 2 illustrates an entertainment system 200 in accordance with an embodiment. The entertainment system 200 includes a television receiver or set-top box 210, a remote control 212, and a monitor 214.

In some embodiments, the set-top box 210 is the electronic device discussed above in relation to the methods 100 and 140. The set-top box 210 includes control logic 220, an output interface 222, a user input interface 224, a signal input interface 226, and a signal processor 228. The set-top box 210 may be a television set-top box for satellite, cable, Internet Protocol, and/or terrestrial television signal reception. Other components, such as a DVR, smart card interface, and the like, may also be incorporated into the set-top box 210.

The control logic 220 may include any control circuitry capable of performing the various operations of the control logic 220 described below, as well as controlling the other components of the set-top box 220 set forth above. In the example provided, the control logic 220 includes instructions to perform at least some of the operations described in FIG. 1A and FIG. 1B. For example, the control logic 220 may include instructions to load user specific operating characteristics as indicated by operation 158. The control logic 220 may include one or more processors, such as a microprocessor, microcontroller, or DSP, configured to execute instructions directing the processor to perform the operations of the set-top box 210. In some embodiments, the control logic 220 may be hardware-based logic, or may include a combination of hardware, firmware, and/or software elements.

The user input interface 224 is configured to receive user input from a user, such as by way of the remote control device 212 being operated or manipulated by the user. As a result, the user input interface 224 may receive any wired or wireless signals, such as infrared (IR) or radio frequency (RF) signals that carry the user input. In some embodiments, the user input interface 224 receives and processes other types of user input signals emanating from the remote control device 212, such as acoustic or optical signals. In some embodiments, the user input interface 224 also includes a control panel or similar construct that allows the user to provide input more directly to the set-top box 210.

The signal input interface 226 is configured to receive television signals 230. The television signals may include various media content. The television signals 230 may conform to any of several formats, thus dictating in part the specific configuration of the interface 226. In the example provided, the television signals 230 are network packets conforming to the Internet Protocol and the signal input interface 226 is a network interface. In some embodiments, the television signals 230 are transmitted to the set-top box 210 via satellite, and a parabolic antenna coupled with a low-noise block converter feedhorn (LNBF) (not shown) may capture and down-convert the frequencies of the satellite signals before passing these signals to the signal input interface 226. In some embodiments the television signals 230 are cable signals where the signal input interface 226 may receive the signals 230 by way of coaxial cable from a cable head-end or distribution facility. In another example, the television signals 230 are terrestrial signals that the signal input interface 226 may receive by way of an over-the-air antenna (not shown). In each case, the signal input interface 226 transfers the received signals to the signal processor 228 of the set-top box 210.

The signal processor 228 may include any of a number of components functionally adapted to process the received television signals 230 for ultimate transfer to the output interface 222. In one example, the signal processor 228 includes at least one tuner (not shown) to select one or more of the received television signals 230 associated with a particular programming channel. Other processing conducted within the signal processor 228 may include demodulation, demultiplexing, decryption, and decoding of the television signals 230. Once processed, the signal processor 228 transfers the signals 230 to the output interface 222.

The output interface 222 outputs an audio/video output 232 resulting from the processing of the television signals 230 to an output device, such as the monitor 214. The output interface 222 may provide the audio/video output 232 in a number of formats, such as modulated RF output, composite video output, component video output, and output conforming to the High-Definition Multimedia Interface (HDMI).

The user may control various aspects of the signal processor 228, such as which of the television signals 230 to view, the audio volume of the selected television signal 230, and so on, by way of the remote control device 212 and the user input interface 224 in conjunction with visual information provided to the user by way of the output interface 222 and the monitor 214. Other functions, such as general set-top box parameter modification, timer recording, electronic program guide (EPG) presentation, and the like, may also be controlled in such a manner. To that end, the control logic 220 generates an image associated with the graphical user interface. The user then manipulates the remote control device 212 to enter user input to the control logic 220 while the control logic 220 provides visual feedback regarding that input to the user by way of the generated image. The user input may include any user-initiated operation, such as volume changes, channel changes, and the like. In the example provided, the control logic 220 stores the user specific operating characteristics to be identified with particular detected acceleration.

In some embodiments, the remote control 212 includes control logic 240 and a sensor unit 241. The control logic 240 may include any control circuitry capable of performing the various operations of the remote control 212. In some embodiments, the control logic 220 is operable to perform at least some of the operations described in FIG. 1A and FIG. 1B. For example, the control logic 220 may capture detected acceleration from the sensor unit 241 to identify the user of the remote control 212. The control logic 220 may include one or more processors, such as a microprocessor, microcontroller, or DSP. In another implementation, the control logic 220 may be hardware-based logic, or may include a combination of hardware, firmware, and/or software elements.

In some embodiments, the remote control 212 is integrated with a television receiver, game controller, or other entertainment device. For example, the remote control 212 may be integrated with a hybrid mass storage and HID pointer device that has partitions defined for each user. The pointer device may then detect when different users are giving presentations, and may switch to an appropriate presentation for display based on the detected user.

The sensor unit 241 illustrated includes an accelerometer 242, a gyroscope 244, and a compass 246. The accelerometer 242 is configured to detect an acceleration of the remote control 212 in each of three axes. The gyroscope 244 is configured to detect a rotation of the remote control 212 in each of the three axes. The compass 246 is a magnetic compass configured to detect directional information in each of the three axes. In some embodiments, the gyroscope 244 and/or the compass 246 may be omitted and/or other types of sensor devices may be added depending on the nature and/or characteristic of the information that is to be acquired by the remote control 212. In the example provided, the sensor unit 241 is implemented using micro-electro-mechanical systems (MEMS) technologies.

In some embodiments, an LED 248 is incorporated. The control logic 240 may turn on the LED 248 when the movement events indicate that the remote control 212 has been picked up. When the movement events indicate that the remote control 212 has been set down, the control logic 240 may reduce power to or turn off the LED 248 to conserve energy.

Figure 3:
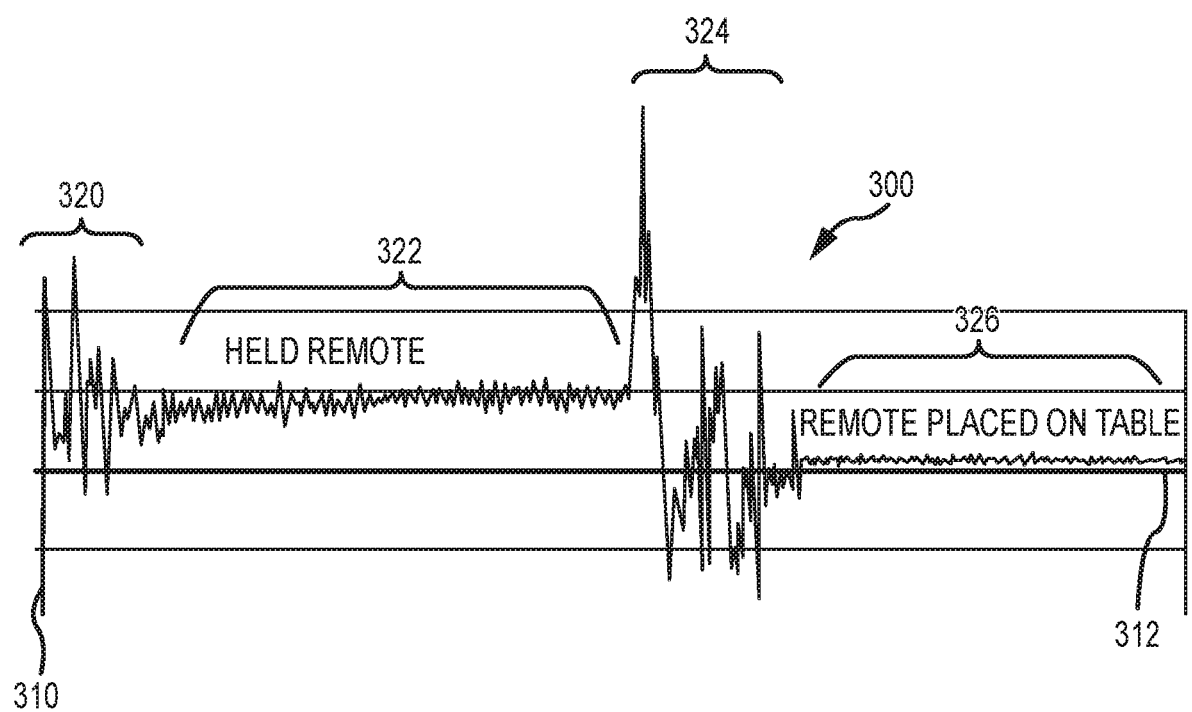
FIG. 3 is a graphical view of an example of accelerometer data in accordance with an embodiment.

FIG. 3 illustrates a graphical view of data 300 captured from the accelerometer 242 corresponding to various events. A magnitude 310 is illustrated on the vertical axis and time 312 is illustrated on the horizontal axis. Event 320 illustrates an example of data that indicates that the remote control 212 has been picked up. Accordingly, the event 320 may trigger a hardware interrupt in the control logic 240 of the remote control 212.

Event 322 illustrates an example of acceleration data associated with a user holding the remote control 212. In the example provided, the control logic 240 samples the data and performs the comparison operation 154 to compare the event 322 with previously stored acceleration data associated with known users of the entertainment system 200. In some embodiments, a user may often sit in a rocking chair, which may be detected by the acceleration data and associated with the user. The position or angle of the remote control 212 may also be incorporated to improve the identification accuracy. For example, a particular user may have a tendency to hold a remote at a particular angle.

Event 324 illustrates an example of data associated with a user setting down the remote control 212. The data associated with event 326 indicates that the remote control 212 is resting on a surface and is not interacting with the user. In some embodiments, the control logic 240 may turn off the LED 248, an OFN, or otherwise place the remote control 212 into a low power state to conserve energy and extend battery life when the remote control detects the event 326.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of identifying a user of an electronic device, the method comprising:
   detecting an acceleration noise pattern of a user manipulated component, wherein detecting the acceleration noise pattern of the user manipulated component further comprises detecting acceleration with an accelerometer and a gyroscope while the user manipulated component is at rest in a hand of a user of the electronic device;
   comparing the detected acceleration noise pattern with user acceleration that is associated with the user of the electronic device, wherein comparing includes comparing time domain data of the detected acceleration noise pattern with time domain data of the user acceleration;
   identifying the user of the electronic device based on the comparison of the detected acceleration noise pattern and the user acceleration; and
   operating the electronic device based on the identified user of the electronic device.

2. The method of claim 1 further comprising:
   selecting the user of the electronic device;
   capturing the user acceleration;
   associating the user acceleration with the user of the electronic device; and
   storing the user acceleration.

3. The method of claim 1 further including turning on components of the user manipulated component based on the acceleration of the user manipulated component and further including turning off the components of the user manipulated component based on the detected acceleration noise pattern indicating that the user manipulated component has been set down.

4. The method of claim 1 further including loading user specific operating characteristics for the identified user, and wherein operating the electronic device further comprises operating the electronic device based on the loaded user specific operating characteristics.

5. The method of claim 4 wherein loading the user specific operating characteristics further comprises loading at least one of programming recommendations for the user, a list of favorite channels specified by the user, parental control information associated with the user, purchase information associated with the user, and remote control codes.

6. The method of claim 1 wherein comparing the detected acceleration noise pattern with the user acceleration includes comparing the user acceleration with the detected acceleration when the user picks up the user manipulated component.

7. The method of claim 1, wherein comparing time domain data with the user acceleration includes comparing using Viterbi methods, Fano methods, or combinations thereof.

8. An entertainment system comprising:
   a television receiver configured to receive video content from a media service provider;
   a remote control configured to interact with the television receiver and including control logic operable to:
      detect an acceleration noise pattern of the remote control while the remote control is at rest in a hand of a user of the remote control;
      compare the detected acceleration noise pattern with user acceleration that is associated with a user of the television receiver, wherein the control logic is further operable to compare time domain data of the detected acceleration noise pattern with time domain data of the user acceleration;
      identify the user of the television receiver based on the comparison of the detected acceleration noise pattern and the user acceleration; and
      operate the television receiver based on the identified user of the television receiver.

9. The entertainment system of claim 8 wherein the television receiver further comprises control logic operable to:
   select the user of the television receiver;
   capture the user acceleration;
   associate the user acceleration with the user of the television receiver; and
   store the user acceleration;
   load at least one of programming recommendations for the user, a list of favorite channels specified by the user, parental control information associated with the user, purchase information associated with the user, and remote control codes.

10. The entertainment system of claim 8 wherein the control logic is further operable to turn on components of the remote control based on the detected acceleration noise pattern of the remote control and is further operable to turn off the components of the remote control based on the detected acceleration noise pattern indicating that the remote control has been set down.

11. The entertainment system of claim 8 wherein the remote control further comprises an accelerometer and a gyroscope, and wherein the control logic of the remote control is further operable to detect acceleration with the accelerometer and the gyroscope.

12. The entertainment system of claim 8 wherein the control logic of the remote control is further operable to compare the user acceleration with the detected acceleration noise pattern when the user is picking up the remote control.

13. An entertainment device comprising:
an accelerometer; and
control logic operable to:
   detect an acceleration noise pattern of the entertainment device using the accelerometer while the remote control is at rest in a hand of a user of the remote control;
   compare the detected acceleration noise pattern with user acceleration that is associated with a user of the entertainment device, wherein the control logic is further operable to compare time domain data of the detected acceleration noise pattern with time domain data of the user acceleration;
   identify the user of the entertainment device based on the comparison of the detected acceleration noise pattern and the user acceleration; and
   operate the entertainment device based on the identified user of the entertainment device.

14. The entertainment device of claim 13 further comprising an indicator light, and wherein the control logic is further operable to turn on components of the entertainment device based on the acceleration of the entertainment device, and where the control logic is further operable to turn off the components of the entertainment device based on acceleration indicating that the entertainment device has been set down.

15. The entertainment device of claim 13 further comprising a gyroscope, and wherein the control logic is further operable to detect acceleration with the accelerometer and the gyroscope.

16. The entertainment device of claim 13 wherein the control logic is further operable to compare the user acceleration noise pattern with the detected acceleration when the user is picking up the entertainment device.

* * * * *